United States Patent
Pedersen

(10) Patent No.: US 12,010,594 B2
(45) Date of Patent: *Jun. 11, 2024

(54) MULTICAST EXPERT SYSTEM INFORMATION DISSEMINATION SYSTEM AND METHOD

(71) Applicant: Robert D. Pedersen, Dallas, TX (US)

(72) Inventor: Robert D. Pedersen, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/862,356

(22) Filed: Jul. 11, 2022

(65) Prior Publication Data

US 2022/0353646 A1    Nov. 3, 2022

Related U.S. Application Data

(63) Continuation of application No. 17/518,536, filed on Nov. 3, 2021, now Pat. No. 11,418,930, which is a
(Continued)

(51) Int. Cl.
| | | |
|---|---|---|
| *H04W 24/00* | (2009.01) | |
| *H04L 12/18* | (2006.01) | |
| *H04W 4/02* | (2018.01) | |
| *H04W 4/14* | (2009.01) | |
| *H04W 4/18* | (2009.01) | |

(52) U.S. Cl.
CPC ........... *H04W 4/18* (2013.01); *H04L 12/1845* (2013.01); *H04W 4/025* (2013.01); *H04W 4/14* (2013.01); *H04L 12/189* (2013.01)

(58) Field of Classification Search
None
See application file for complete search history.

(56) References Cited

U.S. PATENT DOCUMENTS

| 2,936,571 A | 5/1960 | Biemiller |
| 3,662,401 A | 5/1972 | Collins et al. |

(Continued)

OTHER PUBLICATIONS

Giarrantano et al; Expert Systems Principles and Programming; Fourth Edition; 433 pages; Course Technology; Thomson Learning, Inc.; 2005; CA.

(Continued)

*Primary Examiner* — Brandon M Renner
(74) *Attorney, Agent, or Firm* — Steven R. Pedersen

(57) ABSTRACT

Multicast expert system information dissemination systems and methods making use of artificial intelligence are provided. The systems and methods include a wireless device for receiving RF multicast information messages from a content provider wherein said information is descriptive of objects potentially of interest to users of the device. Received multicast messages may include information parameters about objects of potentially interest to the user. The wireless device also includes a knowledge base prestored in the wireless device descriptive of the user's level of interest in various objects. Artificial intelligence expert system control is used to evaluate a combination of the user's level of interest in the object information and distance from the user to the location where the object may be obtained. The artificial intelligence expert system derives a user advisory action index. In one embodiment the artificial intelligence may be implemented using fuzzy logic inference engine apparatus.

20 Claims, 9 Drawing Sheets

Related U.S. Application Data continuation of application No. 17/322,859, filed on May 17, 2021, now Pat. No. 11,197,132.

(56) References Cited

U.S. PATENT DOCUMENTS

| | | | |
|---|---|---|---|
| 4,852,001 | A | 7/1989 | Tsushima et al. |
| 5,301,320 | A | 4/1994 | Mcatee |
| 5,745,687 | A | 4/1998 | Randell |
| 5,768,506 | A | 6/1998 | Randell |
| 5,862,346 | A | 1/1999 | Kley |
| 5,958,071 | A | 9/1999 | Iida et al. |
| 6,317,058 | B1 | 11/2001 | Lemelson |
| 6,334,137 | B1 | 12/2001 | Iida et al. |
| 6,636,884 | B2 | 10/2003 | Iida et al. |
| 7,024,669 | B1 | 4/2006 | Leymann et al. |
| 7,408,907 | B2 | 8/2008 | Diener |
| 7,693,486 | B2 | 4/2010 | Kasslin |
| 7,856,360 | B2 | 12/2010 | Kramer et al. |
| 8,229,458 | B2 | 7/2012 | Busch |
| 8,364,171 | B2 | 1/2013 | Busch |
| 8,437,776 | B2 | 5/2013 | Busch |
| 8,447,331 | B2 | 5/2013 | Busch |
| 8,515,459 | B2 | 8/2013 | Busch |
| 8,566,236 | B2 | 10/2013 | Busch |
| 8,595,824 | B2 | 11/2013 | Albrecht-Buehler |
| 8,626,194 | B2 | 1/2014 | Busch |
| 8,635,645 | B2 | 1/2014 | Krishnamoorthi et al. |
| 8,639,263 | B2 | 1/2014 | Salmon |
| 8,826,175 | B2 | 9/2014 | Wallis |
| 9,024,783 | B1 | 5/2015 | Alfaro |
| 11,605,379 | B2 * | 3/2023 | Han .................. G10L 15/26 |
| 2002/0033767 | A1 | 3/2002 | Krasner |
| 2002/0038228 | A1 | 3/2002 | Waldorf |
| 2002/0147642 | A1 | 10/2002 | Avallone et al. |
| 2005/0249119 | A1 | 11/2005 | Elie-Dit-Cosaque |
| 2007/0027583 | A1 | 2/2007 | Tamir |
| 2007/0281716 | A1 | 12/2007 | Altman et al. |
| 2008/0064446 | A1 | 3/2008 | Camp et al. |
| 2008/0133336 | A1 | 6/2008 | Altman et al. |
| 2008/0294690 | A1 | 11/2008 | Mcclellan |
| 2010/0002075 | A1 | 1/2010 | Jung |
| 2010/0207787 | A1 | 8/2010 | Catten |
| 2012/0036529 | A1 | 2/2012 | Mcclenny |
| 2012/0057716 | A1 | 3/2012 | Chang |
| 2012/0240185 | A1 | 9/2012 | Kapoor |
| 2012/0246650 | A1 | 9/2012 | Mueller |
| 2012/0270573 | A1 | 10/2012 | Marti |
| 2013/0002455 | A1 | 1/2013 | Koehrsen |
| 2013/0095864 | A1 | 4/2013 | Marovets |
| 2013/0122851 | A1 | 5/2013 | Michaelis |
| 2013/0217366 | A1 | 8/2013 | Kolodziej |
| 2013/0295901 | A1 | 11/2013 | Abramson |
| 2014/0092751 | A1 | 4/2014 | Meilik |
| 2015/0161913 | A1 | 6/2015 | Dominguez |
| 2015/0234033 | A1 | 8/2015 | Jamieson |
| 2015/0371659 | A1 | 12/2015 | Gao |
| 2016/0101786 | A1 | 4/2016 | Johnson |
| 2016/0195856 | A1 | 7/2016 | Spero |
| 2017/0005820 | A1 | 1/2017 | Zimmerman |
| 2017/0049785 | A1 | 2/2017 | Herrington |

OTHER PUBLICATIONS

Chen, C.H., "Fuzzy Logic and Neural Network Handbook," McGraw-Hill, Inc., no month, 1996; 423 pages; Hightstown, NJ, US.

Varshney, U., "Multicast Over Wireless Networks," Communications of ACM, vol. 45, Issue 12, Dec. 2002; ACM, New York, NY.

3GPP TS 23.246 V12.3.0 (Sep. 2014) Technical Specification, 3rd Generation Partnership Project; Technical Specification Group Services and System Aspects; Multimedia Broadcast/Multicast Service (MBMS); Architecture and functional description (Release 12) 67 pages; 3GPP Organizational Partners' Publications; no month, 2015; Valbonne, France.

Cox, Earl; "The Fuzzy Systems Handbook,", Academic Press, Inc.; no month, 1994; 336 pages; Chestnut Hill, MA; US.

* cited by examiner

| FEATURE / OBJECT | OBJECT DESCRIPTION | OBJECT LINK 1 VENUE | OBJECT LINK 2 VALUE | OBJECT LINK 3 PHOTOS | OBJECT LINK K FEATURES |
|---|---|---|---|---|---|
| OBJECT 1 | 2014 LEXUS RX350 | ABC AUTO | $100 OVER COST | PHOTO | LOADED |
| OBJECT 2 | INSURANCE SALES POSITION | XYZ INSURANCE | $40K/YR + COMMISION | OFFICE PHOTO | LIFE/HOME AUTO INSURANCE |
| OBJECT 3 | WINE | TOM'S LIQUOR | 10% DISCOUNT | WINE PHOTO'S | BOTTLE OR CASE |
| OBJECT 4 | SAMSUNG HD TELEVISION | TV WAREHOUSE | 15% DISCOUNT | TV PHOTO | 65 INCH 1080P LED |
| OBJECT N | XYZ FOOTBALL TICKETS | PRIVATE SELLER | FACE VALUE | N.A. | LOWER BOWL SEATING |

| INTEREST / OBJECT | VERY LOW INTEREST | LOW INTEREST | MEDIUM INTEREST | HIGH INTEREST | VERY HIGH INTEREST |
|---|---|---|---|---|---|
| OBJECT 1 | | | X | | |
| OBJECT 2 | | | | | X |
| OBJECT 3 | X | | | | |
| OBJECT 4 | | | | X | |
| OBJECT N | | X | | | |

FIG. 4B

ADVISORY ACTION INDEX

MULTICAST EXPERT SYSTEM INFORMATION DISSEMINATION SYSTEM AND METHOD

CROSS-REFERENCE TO RELATED APPLICATIONS

This application is a continuation of U.S. Ser. No. 17/518,536 filed on Nov. 3, 2021, which is a continuation of U.S. Ser. No. 17/322,859 filed on May 17, 2021, issued under U.S. Pat. No. 11,197,132 on Dec. 7, 2021, which is a continuation of Ser. No. 16/951,859 filed on Nov. 18, 2020 issued under U.S. Pat. No. 11,044,585 on Jun. 22, 2021, which is a continuation of Ser. No. 16/828,734 filed on Mar. 24, 2020 issued under U.S. Pat. No. 10,880,701 on Dec. 29, 2020, which is a continuation of Ser. No. 16/555,423 filed on Aug. 29, 2019 issued under U.S. Pat. No. 10,638,278 on Apr. 28, 2020, which is a continuation of U.S. Ser. No. 16/249,797 filed on Jan. 16, 2019, issued under U.S. Pat. No. 10,638,277 on Apr. 28, 2020, which is a continuation of U.S. Ser. No. 15/885,242 filed on Jan. 31, 2018, issued under U.S. patent Ser. No. 10/225,701 on Mar. 5, 2019, which is a continuation of U.S. Ser. No. 15/052,483 filed on Feb. 24, 2016 and issued under U.S. Pat. No. 9,913,116 on Mar. 6, 2018, all of which are incorporated herein by reference.

BACKGROUND OF THE INVENTION

Modern telecommunication systems offer unprecedented opportunities not only for communications between people and machines but also for information dissemination to users located throughout extensive distributed communication networks. In addition to the expanded connectivity and capacity capabilities of these networks, the telecommunication devices themselves available to network users have capabilities far in excess of current usage. Examples include modern cellular telephones, tablet computers and the like with powerful internal processing capability, extensive memory, touch-screen displays, high definition audio capabilities, GPS location capabilities, camera technology and other continually emerging advanced features. These devices communicate via wireless connections with an extensive high-capacity backbone telecommunications network that increasingly makes use of fiber optic and radio frequency technology to provide high-bandwidth communications to millions of users in ways not possible just a few years ago.

Communication with millions of mobile devices in a wireless network has presented new challenges to telecommunication network designers. These challenges have been met in large part by organizing such networks around cellular structures and tracking the location of mobile users throughout the network within those cellular structures. Network location registries are used to continually keep track of every user's cellular location. In this way, connections with individual mobile users can be made by directing calls to a particular cell occupied by particularly mobile user. The user is connected to the network via the familiar cellular telephone radio transmission towers located throughout the network.

In addition to common point-to-point communication connections, sometimes called "unicast" connections, wireless networks today offer other more complex connection capabilities. For example, information may also be "broadcast" for simultaneous reception by multiple users of the network. Such broadcast capabilities are useful, for example, in transmitting danger warning alerts to multiple users in particular areas of the network. A somewhat more difficult connection capability called "multicast" has also been introduced to the wireless cellular telephone network. With multicast connections information can be simultaneously disseminated throughout the network to a selected group of users without being made available to other users including those that maybe located within radio frequency range of selected group members. Multicast capability is more difficult for several reasons including the geographic distribution of intended recipients and control capabilities necessary to ensure proper operation in wireless networks. Nonetheless, modern multicast capability presents new opportunities to network users.

Another area of technology that has not been fully exploited in these networks is the use of artificial intelligence to enhance control and communication capabilities with mobile users throughout the network. In artificial intelligence, a computer system is used to implement an expert system that emulates the decision-making ability of a human. http://en.wikipedia.org/wiki/Expert_system—cite note-Jackson1998-1 Expert systems are designed to solve complex problems by reasoning about knowledge, represented for example as if-then rules, rather than through procedural software program code.

Expert systems make use of a knowledge base and an inference engine. The knowledge base includes data representing system or situational information and rules for evaluating that information. The inference engine applies those rules to evaluate information from the knowledge base and derive output results. For example, the rules may be formulated as precedent if-then propositional calculus statements. Fuzzy logic is a particular form of an expert system that makes use of such if-then propositional statements in the analysis of knowledge base information. Fuzzy logic systems are designed to emulate human reasoning wherein the truth assigned to a particular proposition is allowed to vary over a range from 0 to 1 for more accurate modeling of the uncertainties present in human reasoning. As such, the truth value of a variable is allowed to vary from completely true to completely false. Combining and analyzing such fuzzy representations of multiple variables in fuzzy logic inference engines permits more closely modeling actual uncertainties and human decision-making. Importantly, fuzzy logic computational procedures are simpler than more complex computational system representations and as such are more easily implemented and executed by system control logic. Processing, memory and execution times can all be reduced with fuzzy logic expert systems compared to other implementations.

Certain prior art systems and methods have been proposed and implemented for distribution of information to mobile users and telecommunication networks. The systems and methods are often based on knowing a precise location of a mobile communication user through the use of GPS technology. In these systems an information or content provider disseminates information to mobile users through the wireless telecommunication network based on that provider knowing the location, such as the GPS location, of the mobile user. This location can be provided based on, for example, a GPS sensor located in the mobile device or other location determination capability. An issue with such operation is the requirement that the user disclose his or her GPS location or other indications of location such as addresses or ZIP Codes to the information or content provider. In many instances such disclosure of private information is inappropriate or contrary to the desires of the mobile device user.

For example, such systems and methods may require that the user request specific information from an information or content provider wherein that request includes the GPS location of the user. A request for specific information has the advantage of more precisely matching the information distributed to the requirements of the user. Knowing the users precise location further enables the information or content provider to transmit information based on that location. However, transmitting such user GPS location coordinates has the disadvantage of loss of privacy concerning the user's location. This presents a business and/or personal challenge to both content providers and wireless users that is particular to the use of wireless devices.

Contacting specific websites by the user presents other security and privacy issues. For example, contacted websites typically send a small piece of data from the website called a "cookie" which is stored in the user's web browser while the user is using that website. Every time the user loads the website, the browser sends the cookie back to the server to notify the website of the user's previous activity. Such cookies may be tracked by third parties to compile records of the users browsing history. Avoiding unnecessary contacts of external websites can minimize such security and privacy issues for users of the Internet.

What is needed are systems and methods that permit efficient information dissemination without unnecessary violation of user privacy or security concerns. The claimed solution is necessarily rooted in wireless technology in order to overcome the afore-described problems specifically arising in the realm of wireless networks. More particularly as described in the present invention, artificial intelligence may be implemented in user mobile cellular telephone, tablet computers or the like to improve this situation. Expert system technology permits programming of user interests which may be then efficiently combined with other parameters such as a mobile device computed distance between a given location and the mobile user using artificial intelligence, for example, fuzzy logic systems and methods. The present invention takes advantage of the fact that the user knows his or her location and knows what information he or she desires. Having received that information, the user may then act upon that information, or, if desired, request further information from the information or content provider without disclosing the user location. The challenge of creating meaningful contact with and response from a wireless device user that does not share his or her location information in the context of the wireless network is addressed by this invention. In addition, the present invention discloses the use of artificial intelligence to simplify user decision making requirements. As such, the present invention discloses a solution that is not merely the routine or conventional use of wireless communications.

A particular, but certainly not the only, example of useful information dissemination arises with the distribution of advertising from information and content providers. Such Internet advertising can be an important tool in generating business and provides a desirable service to users of the Internet who wish to be informed of particular opportunities such as the availability of, for example, particular merchandise, sales and promotional offers or particular employment opportunities. The disseminated information may also include specific location such as GPS coordinates or street addresses that may be visited to take advantage of the present an opportunity. Clearly it is not necessary for a mobile user to disclose his or her location to receive such information using, for example, the above described broadcast or multicast communication capabilities.

At the same time, however, efficient operation of such an information distribution system benefits from prior knowledge of the mobile user's interests. Such information is most efficiently organized as database layered objects with more detail available in the lower layers of the database. Multicast communication of limited information from the highest level layers may be sufficient to determine a particular user's interest. In one aspect of the present invention, such received high-level information may be combined with the user location known to the user using artificial intelligence such as fuzzy logic to derive a level of interest index based on the received information and the distance between the user and the content provider having the object of interest. Such first level artificial intelligent filtering of the parameters of a given situation assists the user in evaluation of that situation without requiring unnecessary user attention to received information from content providers that may be of lesser interest. For example, information stating that particular types of automobiles will be on sale during a particular period of time and the location of the automobile dealership may be sufficient to permit the user to decide whether or not to visit the establishment with those automobiles or to request further information from the provider about the automobiles that are on sale. In this case the user contacts the establishment only if such further information is desired. If there is no such desire, no contact of the service provider is made.

An area of particular concern in automotive safety is that of avoiding unnecessary driver distractions. For example, in 2010 the National Safety Council announced that it estimates at least 28% of all traffic automobile crashes in the United States—or at least 1.6 million crashes each year—involve drivers using cell phones and texting. NSC estimates that 1.4 million crashes each year involve drivers using cell phones and a minimum of 200,000 additional crashes each year involve drivers who are texting. Thus the use of cellular telephones in moving vehicles for voice communication causes seven times more crashes then does the use of such telephones for texting. These alarming statistics led to the NSC's call for a ban on cell phone voice and texting use while driving.

Furthermore, recent studies have concluded that uses of cellular telephones for voice communication or texting are only part of the problem. The AAA Foundation for Traffic Study has published a report entitled "Measuring Cognitive Distraction in the Automobile," June, 2013. That report states that it has been estimated that driver inattention has accounted for 25% of all police reported crashes. Other studies indicate that such inattention was a factor in 78% of all crashes or near crashes making it the single largest crash causation factor. The AAA study concluded that on a cognitive distraction scale, driver conversations with other passengers in a motor vehicle, the use of hand-held cellular telephones and the use of hands-free cellular telephones all give rise to about equal cognitive distraction. In all three of these cases cognitive distraction varied from 2.27 to 2.45 times that of non-distracted, single task driving conditions. The use of speech-to-text technology increases cognitive distraction to about three times that of non-distracted, single task driving conditions. Interestingly, hands-free cellular telephone technology offers minimal cognitive distraction advantage over the use of hand-held cellular telephones and rates only slightly better than having a conversation with other passengers in the vehicle.

An important aspect of the present invention is the minimization of cognitive distraction to users of the invention and particularly to drivers or operators of motor vehicles. The present invention takes advantage of artificial intelligence expert system technology to reduce or eliminate the cognitive distraction that might arise when such drivers or operators of motor vehicles may receive unsolicited messages from content providers. Artificial intelligence expert system technology is used in the present invention to emulate the user's reasoning and situation evaluation thereby simplifying the user's decision-making process without requiring user attention to details while operating a vehicle.

Prior art making use of mobile device GPS location capability, multicast communications and/or fuzzy logic includes, for example, the following:

Busch, J., U.S. Pat. No. 8,626,194, Systems and Methods to Determine the Name of a Business Location Visited by a User of a Wireless Device and Provide Suggested Destinations. See also J. Busch U.S. Pat. Nos. 8,566,236; 8,515,459; 8,447,331; 8,437,776; 8,364,171; and 8,229,458. Patents directed, in part, to searching for locations of points of interest based on GPS coordinates of a user with subsequent check-in of the user at selected point of interest.

Kramer, J. F., et. al., U.S. Pat. No. 7,856,360, System for Providing a Service to Venues where People Aggregate. A patent directed, in part, to providing a service to venues where people aggregate including providing information concerning the traits, behaviors or demographics of people who attend said venues and characteristic information concerning the venues and with global positioning system (GPS) location information received from the mobile communication devices.

Altman, S. H., et. al., U.S. Patent Application No. US2007/0281716, Message Transmission System for Users of Location-Aware Mobile Communication Devices in a Local Area Network. A patent application directed, in part, to a process involving location aware mobile communication devices with communication links established between users and a plurality of acquaintances through the respective location aware mobile communication devices with the transmission of user-specified messages or predefined messages to one or more groups of acquaintances within a predefined distance of a user.

Altman, S. H., et. al., U.S. Patent Application No. US2008/0133336, Location-Based Advertising Message Serving for Mobile Communication Devices. A patent application directed, in part, to an advertising platform manager for an advertiser to create and transmit relevant ad messages to a user based on specific location, time, and profile data of the user allowing the creation of ads that directly leverage a key component of the user's interaction with the mobile device in that messages can be tied directly to the location display of a product or service offered by the advertiser.

Avallone, C. V., et. al, U.S. Patent Application Nos. US2002/0147642, Methods and Systems for Providing Personalized Information to Users in a Commercial Establishment and US 2007/0281716. A patent application directed, in part, to providing a user in a commercial establishment with personalized information such as personalized shopping lists, targeted advertisements, health information, nutritional information, promotional offers, offers on sale, offers undiscounted items, manufacturer's coupons, store-wide coupons, information on user specific favorite items, and information on user specific staple items combined with user location information with the goal of providing a user in a commercial establishment information facilitating purchase of desired items in the user's immediate vicinity.

Chen, C. H., "Fuzzy Logic and Neural Network Handbook," McGraw-Hill, New York, 1996. A book setting forth principles and algorithms, applications, in architectures of fuzzy logic and neural network systems.

Cox, Earl, "The Fuzzy Systems Handbook," Academic Press, Inc., 1994. Another book that sets forth principles and algorithms, applications, in architectures of fuzzy logic and neural network systems.

Varshney, U., "Multicast Over Wireless Networks," Communications of ACM, December, 2002. A paper discussing technical aspects of implementing multicast communication over wireless communication networks.

3GPP TS 23.246 V12.3.0 (2014-09) Technical Specification, 3rd Generation Partnership Project; Technical Specification Group Services and System Aspects; Multimedia Broadcast/Multicast Service (MBMS); Architecture and functional description (Release 12). The 3GPP specification for MBMS bearer service offering both broadcast and multicast modes of operation for efficient usage of radio network and core network resources with emphasis on radio interface efficiency.

Salmon, M. D., U.S. Pat. No. 8,639,263, Method and System for Providing Location-Based Information to a Group of Mobile User Agents. Patent directed, in part, to a method and system for providing location-based assistance information such as location assistance when GPS signals are not available and advertising information for nearby merchants including possible multicast transmission of such assistance to a group of users.

Krishnamoorthi, R. et. al., U.S. Pat. No. 8,635,645, Apparatus and Methods of Providing and Receiving Venue Level Transmissions and Services. Patent directed, in part, to apparatus and methods for receiving the venue-based information via unicast, multicast or broadcast transmissions.

SUMMARY OF THE INVENTION

Various embodiments for Multicast Expert System Information Dissemination System and Methods of the present invention are disclosed. In one embodiment, systems and methods are disclosed comprising a specifically programmed mobile communication computer system, with at least one specialized communication computer machine including artificial intelligence expert system decision making electronic capability, and further comprising: at least one RF multicast transceiver for receiving multicast information transmissions; a non-transient memory having at least one portion for storing data and at least one portion for storing particular computer executable program code; and at least one processor for executing the particular program code stored in the memory.

In one embodiment, the above Multicast Expert System Information Dissemination System and Methods further operate wherein the particular program code is configured to at least perform the following operations upon the execution: electronically receiving, by the specifically programmed mobile communication computer system, RF multicast addressed signals from a content provider, wherein the RF multicast addressed signals include information descriptive of objects potentially of interest to a user of the specifically programmed mobile communication computer system; electronically determining, by the specifically programmed mobile communication computer system whether the received multicast RF addressed signal is intended for reception by the specifically programmed mobile communication computer system; and wherein the specifically programmed mobile communication computer system is configured to electronically decode the received multicast RF signal to determine information parameters about an object of potential interest to the user.

In one embodiment, the above Multicast Expert System Information Dissemination System and Methods further process information parameters about an object of potential interest to the user comprising one or more of the following: i) at least one first information parameter identifying object type, ii) at least one second information parameter identifying object description, iii) at least one third information parameter identifying object price, and iv) at least one fourth information parameter identifying object location; electronically determining, by the specifically programmed mobile communication computer system the location of the specifically programmed mobile communication computer system; wherein the specifically programmed mobile communication computer system is configured to electronically determine the location of the specifically programmed mobile communication computer system by using a location sensor; wherein the computer-implemented method does not require content providers determination or knowledge of the location of a user of the specifically programmed mobile communication computer system.

In one embodiment, the above Multicast Expert System Information Dissemination System and Methods further perform, by the specifically programmed mobile communication computer system, artificial intelligence expert system operations comprising at least the following: electronic comparative analysis of the received object information with object information prestored in said specifically programmed mobile communication computer system descriptive of the user's level of interest in that object; electronic generation of results of comparisons of the received object information with object information prestored in said specifically programmed mobile communication computer system descriptive of the user's level of interest in that object; electronically comparing the location of said specifically programmed mobile communication computer system to the location of the where the object may be obtained; and, electronic generation of an electronic communication by the specifically programmed mobile communication computer system to the user of the specifically programmed communication computer system.

In one embodiment, the above Multicast Expert System Information Dissemination System and Methods electronic communication includes an expert system derived advisory action index to advise the user of the specifically programmed mobile communication computer system of specific artificial intelligence expert system derived advice of recommended user actions concerning the object, and wherein said advisory action index is based on an artificial intelligence expert system evaluation of a combination of the user's level of interest in the object, the relative locations of the user and the object of interest and the information parameters determined by the specifically programmed mobile communication computer system.

In a further aspect of the invention, the Multicast Expert System Information Dissemination System and Methods comprise operations wherein the content provider is not informed of the location of said user apparatus.

In a still further aspect of the invention, the Multicast Expert System Information Dissemination System and Methods comprise operations wherein the user of said apparatus registers with the content provider to receive selected object information corresponding to objects of interest to the user.

In a yet further aspect of the invention, the Multicast Expert System Information Dissemination System and Methods comprises artificial intelligence expert system control circuitry with fuzzy logic inference control circuitry.

In a yet further aspect of the invention, the Multicast Expert System Information Dissemination System and Methods comprise artificial intelligence expert system with a knowledge base and an inference engine.

In a yet further aspect of the invention, the Multicast Expert System Information Dissemination System and Methods comprise operations wherein the user may be one of multiple users assigned the same multicast addresses.

In a further aspect of the invention, the Multicast Expert System Information Dissemination System and Methods comprise operations wherein a specific received RF multicast signal is a pushed signal received without a specific request transmitted from the user apparatus to the content provider for that specific received RF multicast signal.

In another aspect of the invention, the Multicast Expert System Information Dissemination System and Methods comprise operations wherein the received pushed signal is an SMS signal.

In an additional aspect of the invention, the Multicast Expert System Information Dissemination System and Methods comprises configurations wherein the wireless apparatus location sensor is a GPS sensor.

In an additional aspect of the invention, the Multicast Expert System Information Dissemination System and Methods comprise operations wherein control circuitry further provides a time estimate for the user of said apparatus to travel to said location where the object is available.

In an additional aspect of the invention, the Multicast Expert System Information Dissemination System and Methods comprise operations wherein the time estimate is based at least in part on the user being in a vehicle and on the traffic or roadway conditions between the vehicle and the location where the object is available.

BRIEF DESCRIPTION OF THE DRAWINGS

While the invention is amenable to various modifications and alternative forms, specific embodiments thereof are shown by way of example in the drawings and will herein be described in detail. The inventions of this disclosure are better understood in conjunction with these drawings and detailed description of the preferred embodiments. The various hardware and software elements used to carry out the inventions are illustrated in these drawings in the form of block diagrams, flowcharts and descriptive tables setting forth aspects of the operations of the invention.

It should be understood, however, that the drawings and detailed descriptions are not intended to limit the invention to the particular form disclosed, but on the contrary, the intention is to cover all modifications, equivalents and alternatives falling within the spirit and scope of the present invention as defined by the appended claims.

FIG. 4A illustrates, without limitation, exemplary expert system object knowledge base examples for the Multicast Expert System Information Dissemination System and Methods of this invention.

FIG. 4B illustrates, without limitation, exemplary expert systems knowledge base user object interest indices for the Multicast Expert System Information Dissemination System and Methods of this invention.

DETAILED DESCRIPTION

The above figures are better understood in connection with the following detailed description of the preferred embodiments.

Figure 1:
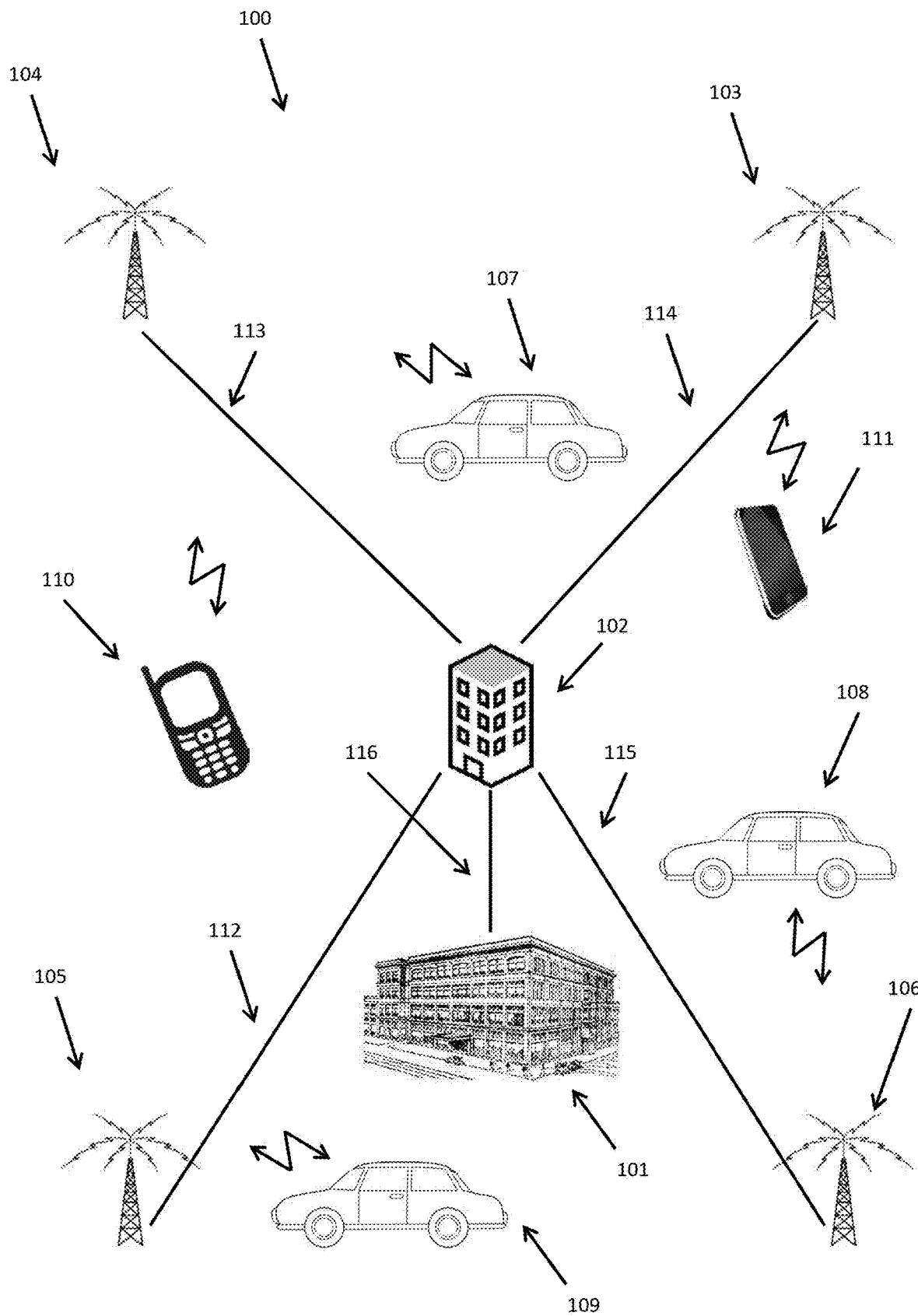
FIG. 1 illustrates, without limitation, an exemplary communication network configuration for the Multicast Expert System Information Dissemination System and Methods of this invention.

FIG. 1 depicts, without limitation, an exemplary communication network configuration 100 for the Multicast Expert System Information Dissemination System and Methods of this invention. Information such as advertisements or promotional material is provided via the content provider 101. Content provider 101 may represent a commercial establishment such as a store, restaurant, merchandise supplier or other place of business that may originate transmission of messages to selected mobile communication devices for the purpose of advising users of those devices of particular opportunities that may be of interest to those users. Content provider 101 may interface with the cellular telephone network via separate service providers or aggregators not shown for the purpose of coordinating communications with the content provider 101 and cellular device users in the cellular telecommunication network.

As also depicted in FIG. 1, the content provider 101 communicates with the cellular telephone network via a switching or control center 102 either directly or via the separate service providers or aggregators not shown as discussed above. The switching or control center 102 is in turn connected to cellular telephone radio signal transmission towers 103, 104, 105, and 106 as shown in FIG. 1. Although FIG. 1 depicts operation with a singular switching or control center 102, it is to be understood that the present invention may be operated with several such interconnected switching and control centers distributed over larger geographic areas which are in turn connected to yet further cellular telephone radio transmission towers not shown in FIG. 1.

As further illustrated in FIG. 1, multiple wireless user communication and processing devices such as mobile cellular telephone network users, automobiles 107 and 108, cellular telephone 110, or other remote wireless devices such as tablet computers, laptop computers, PDAs or other mobile user devices 111 may communicate with the content provider 101 of this invention.

In operation of the present invention, various mobile wireless user communication and processing devices such as those represented by automobiles 107, 108, and 109, cellular telephone 110 or other communication devices 111 are organized in subgroups with common interests to receive multicast advisory messages intended for individual subgroups without any of the above communication devices disclosing their location or otherwise contacting content provider 101 or an associated service provider or aggregator requesting such advisory messages. In an aspect of this invention, the individual mobile wireless user communication and processing devices identified above include artificial intelligence expert system capabilities such as fuzzy logic for the purpose of assisting the users of those devices in formulating appropriate actions or responses based on the received advisory messages as described in more detail below. Those actions may include for example, without limitation, traveling to the location 101 to further understand or take advantage of the opportunity presented in the advisory message, to request further information from the content provider 101 regarding the advisory message, or to do nothing.

An aspect of the present invention is the multicast distribution of information and use of artificial intelligence expert system capabilities in the above-described distributed wireless user communication and processing devices to assist users in the evaluation of opportunities offered by the content provider 101. Multicast technology, without limitation, allows for the content to be delivered to multiple devices in select individual cell sites or clusters of cell sites such as those indicated by cell sites 103, 104, 105, and 106 of FIG. 1. For example a select cell site or cluster of cell sites in relatively close proximity to the content provider 101 may be used to limit the geographic area to system users that are in a relative or defined proximity to the content provider 101. In addition, the group of users receiving the multicast transmission may be further reduced by special addressing to limit recipients to only those that have registered with the content provider 101 to receive information concerning particular objects. This approach has several advantages including reduction of communications between the distributed cellular communication devices and the content provider 101 resulting in more efficient use of the telecommunications signal spectrum, lower power requirements of the distributed telecommunication devices and protection of privacy including specific location information for the users of those distributed telecommunication devices. In addition, by only addressing content information to a select group of users, annoyance or inconvenience to users with no interest or who have indicated no interest can be avoided. Such respect of user interest should be appreciated by the population within radio range of the cellular transmission towers being used for the multicast signal transmission. In much the same manner that a "no call list" can be used to limit annoying calls to telephone system users, the use of multicast signaling with addressing only those users who have indicated an interest in the particular material to be transmitted is achieved in the present invention.

Figure 2:
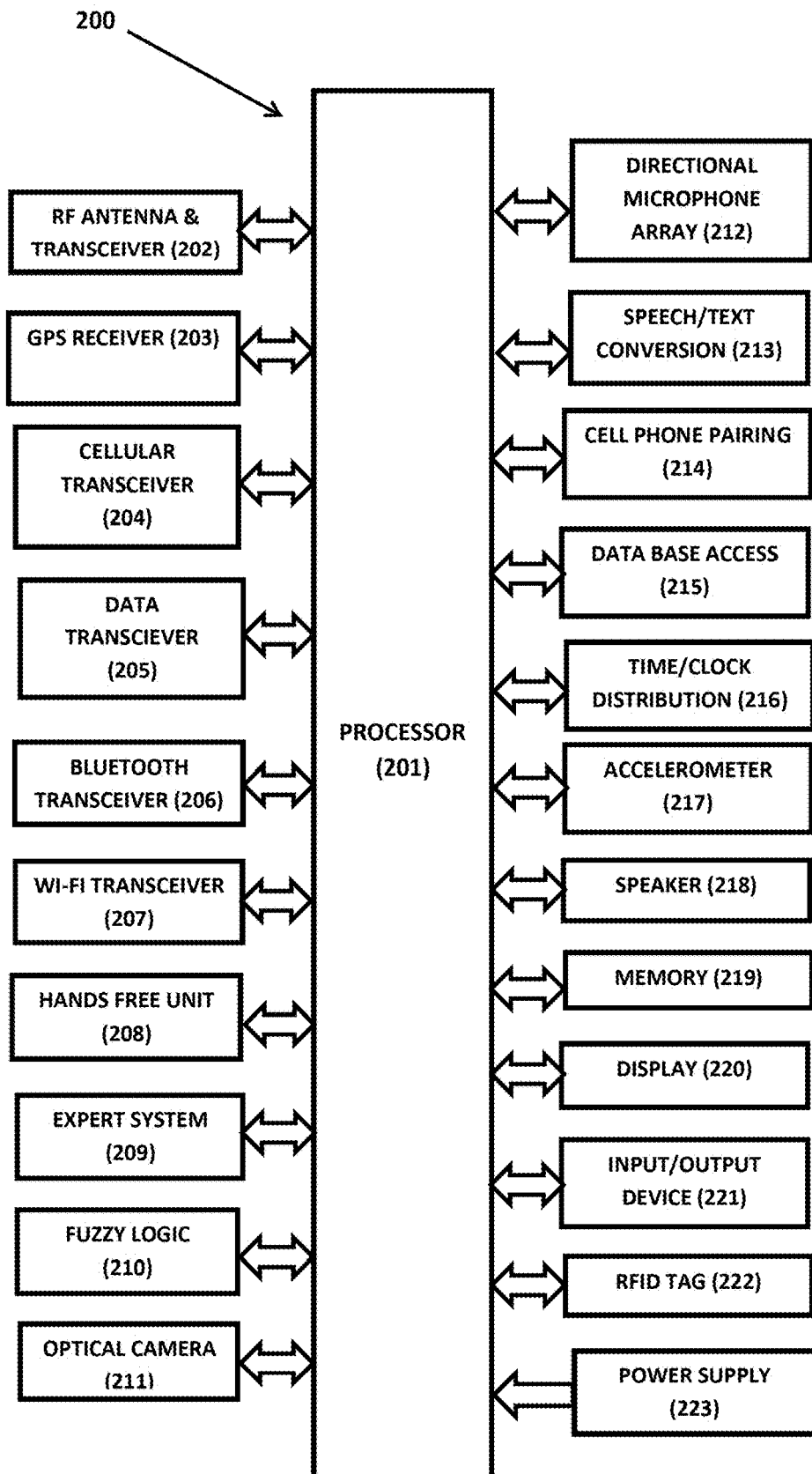
FIG. 2 illustrates, without limitation, an exemplary wireless user communication and processing device with associated control features for the Multicast Expert System Information Dissemination System and Methods of this invention.

FIG. 2 depicts, without limitation, a block diagram of exemplary elements of a wireless user communication and processing device 200 of the type illustrated in FIG. 1. The wireless user communication and processing device 200 may be for example a cellular telephone, tablet computer, laptop computer, or communication devices operational within motor vehicles. The processor 201 may be of any suitable configuration that will be known to those of skill in the art. For example, the processor 200 may be a microprocessor, a DSP (digital signal processor), or other digital control circuitry suitable for this application. In addition the processor 201 may be configured using a combination of these technologies.

As also shown in FIG. 2, the wireless user communication and processing device 200 may include multiple interconnected capabilities that may be attached to or designed as an integral part of the hardware or software of the processor 201. These various capabilities useful in the operation of the wireless user communication and processing device 200 of this invention are briefly characterized below and discussed more completely in association with the additional FIGS. 3-8.

As shown in FIG. 2, the wireless user communication and processing device 200 may include an RF (radio frequency) antenna and transceiver 202 to receive and detect radio signals. For example, such signals may originate as cellular telephone signals, Bluetooth signals, Wi-Fi signals, or other communication or control signals. The RF antenna and transceiver 202 may comprise multiple antennas and transceivers. The RF antenna and transceiver 202 may further comprise directional or omnidirectional antenna configurations.

As further indicated in FIG. 2, the wireless user communication and processing device 200 may include a GPS (Global Positioning System) receiver 203 useful for tracking the location and movements of the distributed telecommunication device 200. The Global Position System (GPS) may make use of triangulation calculations of positions based on signals received from multiple geostationary satellites. Such systems provide location information accurate within approximately one meter. Massive databases exist providing GPS coordinates for virtually every addressable location in the United States and elsewhere. Mobile communication networks implement Home Location Registries (HLRs) and Visitor Location Registries (VLRs) providing instant location information on mobile wireless devices through the country. Such databases also provide detailed maps of highways and roadways used by motor vehicles. Such route maps and location information may be used in the present invention to verify that a motor vehicle is indeed traveling on established highways or roadways and further to provide markings of the location of such a vehicle as a function of time along those known routes. This information can be used in combination with accurate time/clock information available to the wireless user communication and processing device 200 of this invention using, for example, time/clock distribution unit 216 shown in FIG. 2. Knowing the elapsed time interval between successive points with known distance between those points permits computation of the speed of a moving motor vehicle.

In addition to GPS sensors, while not shown in FIG. 2, it is to be understood that the wireless user communication and processing device 200 may determine location based on cellular telephone radio tower locations. Other location determination methods may also be used such as use of the location of particular Wi-Fi receivers or routers used to communicate with wireless user communication and processing device 200 of FIG. 2.

As also shown in FIG. 2, the wireless user communication and processing device 200 may include a cellular transceiver 204 used to receive and transmit cellular communication information between the device 200 and external sources accessible to the multicast expert system information dissemination system and methods of this invention, including the content provider 101 of FIG. 1.

In addition, as shown in FIG. 2, the wireless user communication and processing device 200 may further include a data transceiver 205 useful for communications with content provider 101 of FIG. 1 and with other devices, control and display systems, as well as telecommunication devices or cellular telephones used by others. The data transceiver 205 may be in addition to the other transceivers of FIG. 2 and may operate on different frequency bands, use different signaling protocols, use different signal modulation formats including various forms of amplitude modulation, frequency modulation, phase modulation or various combinations of these techniques.

Similarly, as shown in FIG. 2, the wireless user communication and processing device 200 may also include a Bluetooth transceiver 206 and/or a Wi-Fi transceiver 207. Both Bluetooth and Wi-Fi transceivers are used for short range voice and/or data communications. For example, in the present invention such Bluetooth and/or Wi-Fi transceivers may be used to form short range personal area networks (PAN) or piconets for communication with other devices near the wireless user communication and processing device 200. Such other devices may include for example laptop computers, tablet computers, printers, or other local display or input output devices that may access the Internet through such a local area network or piconet involving the telecommunication device 200. In such configurations, the device 200 may serve as a master control point in the personal area network or piconet with the other devices operating as a slave in a master/slave relationship. The device 200 may also, of course, operate as a slave in such configurations.

As indicated in FIG. 2, the wireless user communication and processing device 200 may include hands-free unit 208 permitting operation of the device in a hands-free mode. Such units may connect to a telecommunications device or cellular telephone using, for example Bluetooth 206, Wi-Fi 207 or other radio frequency data transceiver 205 communication links. The hands-free capability 208 permits answering, placing and carrying on voice or text communications via an external cellular telephone network using voice commands only without requiring a vehicle driver to hand-manipulate or otherwise operate telecommunications or cellular telephone equipment while driving.

The distributed wireless user communication and processing device 200 of FIG. 2 may include artificial intelligence expert system technology 209 as described above with the goal of improving decisions made by users of the distributed devices 200. Such expert system technology may prove especially beneficial in assessing the degree of interest in particular objects being presented by the content provider 101 of FIG. 1. The use of artificial intelligence expert system technology 209 may also simplify the user interface and reduce cognitive distractions of the user including, for example, drivers of motor vehicles. The artificial intelligence expert system technology 209 is designed to emulate human reasoning and provide a simplified advisory action index indication to the user without requiring distracting user thought, evaluation of received information or manual operation of the distributed wireless user communication and processing device 200.

As also indicated in FIG. 2, the distributed wireless user communication and processing device 200 may include expert system fuzzy logic capability 210. Fuzzy logic may be implemented using inference engine technology as described above in implementation of a method of representing analog processes on a digital computer. With fuzzy logic control, operational rules are formulated as propositional logic statements. These statements represent somewhat imprecise ideas reflecting the states of system variables. Fuzzy logic is particularly appropriate when an expert or user is available to specify these propositional statements characterizing the relationships between system variables. In the present invention such propositional statement and fuzzy logic may be beneficial in characterizing the relationships between various parameters characterizing information distribution and user location information as described more completely below.

As also shown in FIG. 2, the wireless user communication and processing device 200 may include an optical camera 211 for capturing images of situations near the user of the telecommunication device to assist in the evaluation of situations.

As also indicated in FIG. 2, the distributed wireless user communication and processing device 200 may include one or more directional acoustic beamforming microphone arrays 212. Such directional, beamforming microphone arrays are useful in isolating and capturing audio voice signals from individual speakers in the presence of interfering signals from other speakers and other environmental noise signals. For example, in the environment depicted in FIG. 1, environmental noise signals may include audio signals generated from other sources including nearby crowd noise, automotive engine and vehicle operation and external noises such as generated by traffic or wind outside of a vehicle or other road noises. Directional beamforming microphone arrays are particularly useful in isolating speech signals of a desired speaker to the exclusion of other noise signals in the environment of the speaker. Such isolation and improvement in audio speech signal quality may be important in the present invention for voice communications between the distributed wireless user communication and processing device 200 and the content provider 101. In some embodiments, such voice communication may be used by the user of communication and processing device 200, for example to inquire further concerning particular opportunities for selected objects presented by the content provider 101.

As also shown in FIG. 2, the distributed wireless user communication and processing device 200 may include a speech-to-text conversion capability 213. In some embodiments of this invention the speech-to-text conversion capability 213 may be used to convert speech signals received from the directional microphone arrays 212 to text form, as well as for conversion of speech signals received by a wireless user communication and processing device 200 of the present invention. The resulting digital text messages may be displayed, transmitted using digital communication links or used to facilitate system control operations. Such technology may also be used to convert received voice signals to text for display to the user as appropriate.

Telecommunication device or cell phone "pairing" 214 may also be included in the wireless user communication and processing device 200 of the present invention. Such "pairing" permits a telecommunication device or cell phone to be connected other communication devices such as vehicle telecommunication devices by telecommunication links such as Bluetooth, Wi-Fi or the like. With these connections, voice or data communication signals transmitted to and from the telecommunications device or cellular telephone may be relayed through the vehicle communication system via the interconnecting telecommunication links. In addition, such "pairing" permits commands and responses to be communicated between a telecommunications device or cellular telephone and other devices such as a motor vehicle.

In addition, as shown in FIG. 2, the wireless user communication and processing device 200 may further include a data-base access capability 215 connected to processor 201 for accessing and updating data-base information useful in the operation of the present invention, including the knowledge base information used in the artificial intelligence assessment of opportunities presented to the user by the content provider. The data-base information may be stored locally as part of the wireless user communication and processing device 200 or may be located remotely and accessible, for example, through the Internet or cellular telephone communication networks. Such remote storage may include remote servers or Internet cloud computing and/or storage systems. In some instances, database information may also be accessed from information stored in other control and information data files implemented in a motor vehicle such as information stored for use by vehicle information display systems. Such vehicle information display systems may include information necessary for dashboard displays concerning vehicle operational status, speed, odometer readings, engine performance, fuel levels and warning signals. In addition, other control and information data files implemented in the motor vehicle may include files used to drive other on-board displays including, for example, touch screen displays or displays manipulated using point-and-click delete operator controls for navigating and selecting information to be displayed including, for example, navigation information and maps, vehicle status, weather, entertainment system control, telecommunication device control and the like. In some embodiments of this invention, information from distributed wireless user communication and processing device 200 may in fact be displayed on such other on board displays or may be made available for access by the motor vehicle driver passengers using such displays. In some embodiments of this invention the distributed wireless user communication and processing device 200 may be integrated into and made an operational part of other user accessible display systems.

In addition, as shown in FIG. 2, the distributed wireless user communication and processing device 200 may further include a time/clock distribution capability 216 operating to provide accurate date and time information available to distributed telecommunication devices 200. Such information may be used, for example, in the calculation of vehicle speed by providing elapsed time between particular vehicle location points along a route of travel. Such time and date information may also be used to create history files recording occurrences of driver use of telecommunication devices or cellular telephones. Accurate date and time information may also be important in the evaluation are responding to time sensitive opportunities presented by the content provider 101 of FIG. 1.

In addition, as shown in FIG. 2, the wireless user communication and processing device 200 may further include accelerometer 217 capabilities. An accelerometer is a device that can measure the force of acceleration, whether caused by gravity or by movement. An accelerometer can therefore be used to measure or assist in the measurement of the speed of movement of an object to which it is attached. Useful accelerometer technology includes piezoelectric, piezoresistive, resonant, strain-gauge, capacitance, tunneling, and heated liquid and gas accelerometers. Silicon MEMS accelerometers that work on the capacitive approach or ones that that are based on temperature differentials in heated-gas are useful in some embodiments of this invention. Such thermal accelerometers may be fabricated in monolithic structures with integration with all the necessary signal conditioning, interface and embedded circuitry on a single integrated circuit.

A speaker unit 218 may also be included as part of the wireless user communication and processing device 200. The speaker may be used, for example, to announce the results of artificial intelligence expert system analysis of opportunities presented by the multicast expert system advertising systems and methods of this invention. The speaker may also be used to announce information from the content provider 101 of FIG. 1.

In addition, as shown in FIG. 2, the wireless user communication and processing device 200 may further include associated memory 219 for storing software programs, the artificial intelligence knowledge base described above, vehicle information, measurement history information and other data useful or collected by the distributed wireless user communication and processing device 200 in the operations of this invention. The associated memory 219 may comprise random access memory (RAM), read only memory (ROM), programmable read-only memory (PROM), electronically programmable read-only memory (EPROM), other solid-state memory, disk memory, magnetic tape memory or other magnetic memory devices, optical memories or any other appropriate memory technology known to those of skill in the art. While memory unit 219 is shown in FIG. 2 as a separate assembly, it is to be understood that some or all of such memory may be distributed among the various operational, control and communication capabilities illustrated in FIG. 2.

In addition, as shown in FIG. 2, the wireless user communication and processing device 200 may further include display capability 220 for displaying operational status and information concerning the results of the artificial intelligence expert system evaluation of opportunities presented to the user. The display 220 may be a separate display associated with distributed devices 200, or, alternatively, the display 220 may be integrated with an operational part of other displays present in a motor vehicle including those discussed above. Useful displayed technologies include liquid crystal displays (LCD), light emitting diode displays (LED), plasma displays, and smart glass, touch screen displays, menu-driven displays, and displays operated using speech commands or other suitable display technology.

In addition, as shown in FIG. 2, the wireless user communication and processing device 200 may further include additional input-output-device 221 capabilities. For example, standard USB ports may be used for such access. Other possibilities include the Common Flash memory Interface (CFI) approved by JEDEC and other standard memory unit interfaces.

In addition, as shown in FIG. 2, the distributed telecommunication devices 200 may further include a power supply 223 necessary for operation of the distributed devices 200 including the various capabilities depicted in FIG. 2. The power supply 223 may derive energy from the vehicle electrical power supply source or may be implemented as a separate battery or energy supply including, without limitation, solar energy, energy derived from external impinging electromagnetic waves, or energy derived from motor vehicle mechanical operations such as breaking or coasting.

Figure 3:
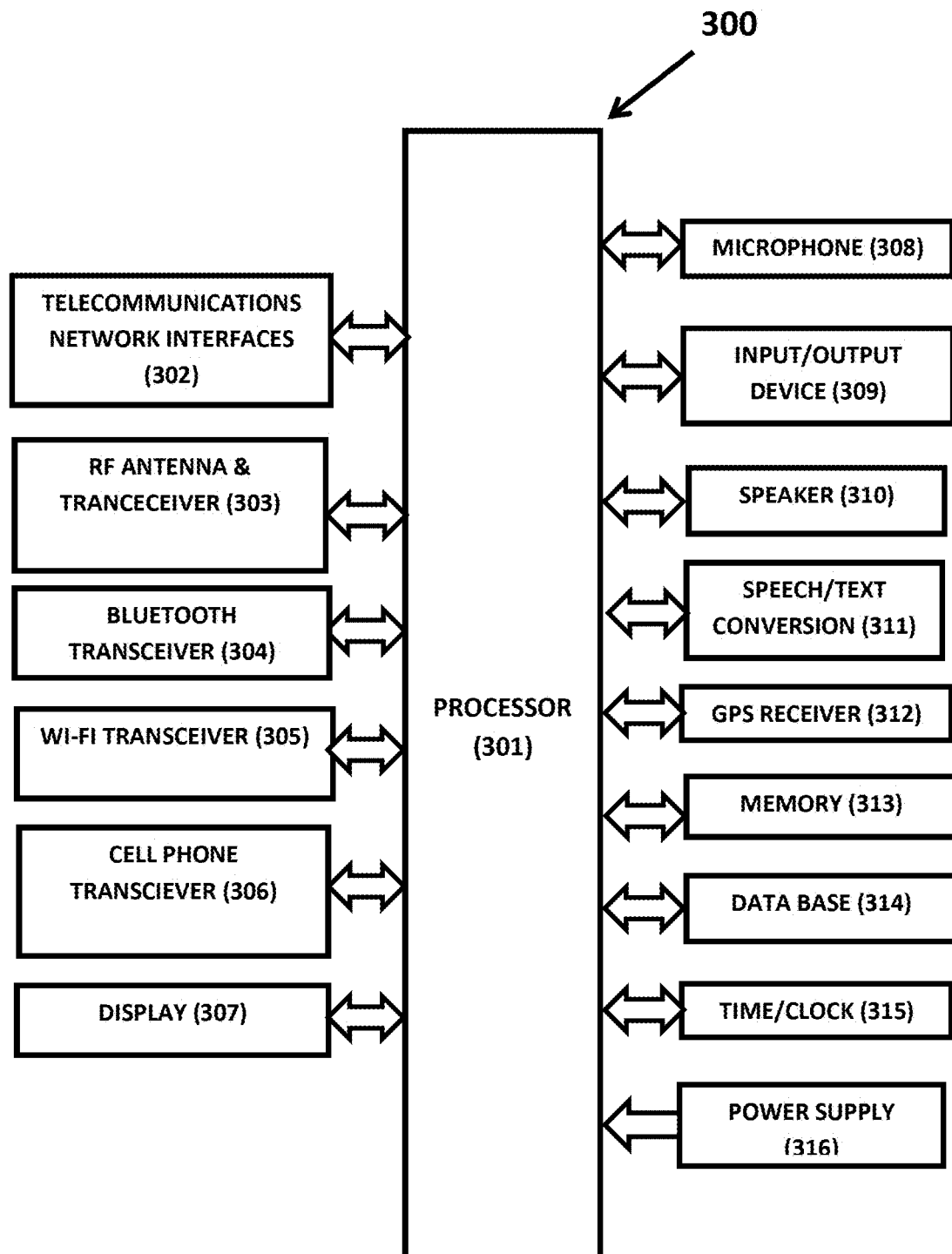
FIG. 3 illustrates, without limitation, an exemplary information content provider server configuration for the Multicast Expert System Information Dissemination System and Methods of this invention.

FIG. 3 provides a more detailed exemplary configuration diagram for the information content provider server configuration 300 of the content provider 101 of FIG. 1. The information content provider server configuration 300 is controlled by processor 301 which may be a microprocessor, laptop computer, desktop computer, mainframe computer or other digital computer or controller of the type well known to those of skill in the art. The processor 301 may include without limitation computer processing capabilities as well as more specialized processing capabilities implemented for example with digital signal processing (DSP). The processor 301 is connected to memory 313 for storage of programs and data for the information content provider server configuration 300. The memory 313 may comprise, without limitation, random access memory (RAM), read only memory (ROM), programmable read-only memory (PROM), electronically programmable read-only memory (EPROM), other solid-state memory, disk memory, magnetic tape memory or other magnetic memory devices, optical memories or any other appropriate memory technology known to those of skill in the art. The processor 301 is also connected to a power supply 316 which may comprise without limitation batteries, AC/DC power converters, solar cells, or other green energy power sources. The processor 301 may also include connections to input/output device capabilities comprising without limitation USB ports, Common Flash memory Interface (CFI) approved by JEDEC and other standard memory unit interfaces. The processor 301 also includes connection to a speaker 310 for broadcasting audio signals from the information content provider server configuration 300. A microphone 308 is connected to the processor 301 to allow multicast dissemination of voice communications to wireless mobile users of the present invention. Such communications may further describe opportunities presented by the content provider 101, answer questions, or provide further information to wireless mobile users.

As shown in FIG. 3, database 314 may be implemented separately or as part of the system software operating on processor 301 for use in accessing system parameters, control information, status information, history, audio recordings, video recordings, image recordings, operational information, contact information, Internet addresses, telephone numbers, received messages, alarm signals and/or other information used in the operation of the information content provider server configuration 300. Database 314 may also be, either partially or completely, located remote from the information content provider server configuration 300 of the content provider 101, as part of remote server configuration, the distributed database or in other distributed cloud-based computing and information storage systems. The database 314 also includes selected parameters of artificial intelligence and expert system knowledge base used in the present invention.

As also shown in FIG. 3 the processor 301 may operate with display 307 for displaying images, control information or messages received by the information content provider server configuration 300.

In addition, as also shown in FIG. 3, information content provider server configuration 300 may include telecommunication network interfaces 302 which may include, for example, wireline, cable or fiber optic connections to public or private telecommunication networks including the Internet. RF antenna and transceiver 303 may comprise one or more antenna and/or transceiver configurations and may include, for example, the omnidirectional or directional antennas. Similarly, information content provider server configuration 300 may include, without limitation, a Bluetooth transceiver 304, Wi-Fi transceiver 305 and/or cell phone transceiver 306 for communication with the wireless, mobile telecommunication transceivers in FIG. 1 as detailed more completely in FIG. 2. Bluetooth transceiver 304 and Wi-Fi transceiver 305 may operate as hotspot access points (NAP) in forming personal area networks (PAN) or piconets enabling other devices on those networks and located at the information content provider server configuration 300 to communicate via the Internet. Alternatively Bluetooth transceiver 304 and Wi-Fi transceiver 305 may communicate with a separate network access point (NAP) for connection to the Internet with subsequent routing to the wireless remote cellular telephone or other communication devices as depicted in FIG. 1.

The information content provider server configuration 300 of FIG. 3 may also include a GPS receiver unit 312 for an accurate determination of the location of processing and communication center 300. Other positioning technology not shown may include determining positions based on cellular telephone tower locations, Wi-Fi signal location technology or other location determination capabilities known to those of skill in the art. The precise location of the information content provider server configuration 300 may be important, for example, in transmitting opportunity or advertising content to users of the multicast expert system information dissemination system and method of this invention. Such information may in turn be used by artificial intelligence expert system capabilities in the distributed wireless remote receivers of FIG. 1 to assist in determining the level of interest to the particular opportunity to users of the system. The use of the GPS receiver 312 in the information content provider server configuration 300 of FIG. 3 also provides the capability of moving the processing and communication center 300 to different locations. For example, in some embodiments the information content provider server configuration 300 may be implemented using a laptop, tablet or other portable computer and communication device. Such a portable information content provider server configuration 300 permits multicast transmission of opportunity information from different locations depending on the location of that opportunity.

The information content provider server configuration 300 of FIG. 3 may also include a speech-to-text conversion capability 311 to permit audible commands from a system operator of the processing and communication center 300 to be converted from speech to text for dissemination to wireless mobile users of the present invention. The speech-to-text conversion capability 311 may also be used for recognition of spoken responses or requests received from mobile wireless users as shown in FIG. 1 of this invention.

The information content provider server configuration 300 of FIG. 3 may also include a time/clock unit 315 for providing accurate time information. The time/clock unit 315 may operate off the power supply unit 316 or separate batteries or power supply to ensure accurate time information. Such accurate time information may be disseminated to remote wireless users of the present invention to ensure coordinated and accurate time available throughout the multicast expert system information dissemination system and methods of this invention. Ensuring that all users are operating with the same time base avoids confusion or misunderstandings especially when particular opportunities are time sensitive. For example, if a content provider has merchandise for sale only until a specified time, that information may be important to recipients of information describing an opportunity. It may not be practical or possible for the user to take advantage of an opportunity based on such time limitations.

FIG. 4A depicts, without limitation, an expert system object knowledge base 400 categorization of objects 1 to N representing example different opportunities to be presented by the multicast expert system information dissemination system and methods of this invention. The expert system object knowledge base 400 is created by a content provider and is maintained in the information content provider server configuration 300 of FIG. 3. Illustrated in the figure are descriptions of the individual objects. In the examples listed, the objects are a 2014 Lexus RX 350 automobile, an insurance salesman position, wine, a Samsung high-definition television and XYZ football tickets. The database also includes for each object additional links providing access to further information about each of the identified objects. For example, without limitation, the first link identifies the venue where the object is available to the users. In addition to the name of the venue, the database will include the location of the venue such as GPS coordinates or other location information not shown in FIG. 4A. For example, in FIG. 4A the 2014 Lexus RX 350 automobile is available at ABC Auto. Object 2, the insurance sales position, is being offered by XYZ insurance company. In a similar manner Object 3, the wine, is available at Tom's Liquor; object 4, is available at TV Warehouse and object N is available from a private seller.

As also shown in FIG. 4A, the exemplary expert system object knowledge base 400 includes an additional Object Link 2 assigning a value to each of the objects in the database. For example, the 2014 Lexus RX 350 is offered for sale at $100 over the dealer cost. The insurance sales position at XYZ insurance pays $40,000 per year plus a commission. Object 3, the wine, is offered by Tom's Liquor at a 10% discount. Similarly, object 4 for the Samsung HD television is offered at a 15% discount. And Object N football tickets are offered by the private seller at face value.

As further illustrated in FIG. 4A, an exemplary additional Object Link 3 in the object database 400 may provide access to photographs or other visual representations of each of the respective objects.

Multiple other links may be provided, without limitation, in the expert system object knowledge base 400 of FIG. 4A. In the example of FIG. 4A, K such links are provided. In this example Link K identifies particular features of each of the individual objects that may be important to users of this invention. For example, Object 1, the 2014 Lexus RX 350 is described as being "Loaded." Object 2, the insurance sales position, is described as a position for selling life/home/automobile insurance. Object 3, the wine offered by Tom's Liquor may be purchased at the advertised discount by the bottle or by the case. Object 4, the Samsung HD television, has a 65 inch screen with 1080P and LED technology. Object N, the football tickets, are for seats in the lower bowl of the football stadium.

The expert system object knowledge base 400 of FIG. 4A may be accessed by users depending on their level of interest in each of the respective objects as described further below. In one embodiment of this invention, only the object description information in the first column of FIG. 4A may be transmitted in the multicast message distribution operations. Depending on the level of interest, and individual user may then access additional information represented in subsequent columns of the expert system object knowledge base 400 depicted of FIG. 4A. In yet another embodiment of the invention, information in the first two columns of the representative expert system object knowledge base 400 including the object description and identification of the venue and its location may be transmitted in the multicast information distribution operation. In other embodiments, other combinations of the information in FIG. 4A may be included in the multicast transmission. Based on the information received in the multicast transmission, the user may elect to proceed directly to the venue offering the opportunity, to request more information or to do nothing. Note that in receiving and responding to the multicast transmission to obtain further information, the user is not required to identify its location.

FIG. 4B depicts expert systems knowledge base user object interest indices 401 illustrating the level of interest of an individual in each of the objects 1 to N in the expert system object knowledge base 400 of FIG. 4A. The expert systems knowledge base user object interest indices 401 may be maintained in the wireless user communication and processing device 200 of FIG. 2. In this case, the information for the expert systems knowledge base user object interest indices 401 are provided by individual users of the multicast expert system information dissemination system and methods of this invention. Such information is provided when the user registers for use of the present invention and may be updated periodically as entries in the expert system object knowledge base 400 of FIG. 4A are updated by individual content providers. A copy of the information in the expert systems knowledge base user object interest indices 401 may also be maintained in the information content provider server configuration 300 of FIG. 3 of the content provider 101 of FIG. 1. In one embodiment such expert systems knowledge base user object interest indices 401 may in fact be transmitted from the information content provider server configuration 300 to individual user's wireless user communication and processing device 200 of FIG. 2. In yet another embodiment that information may be transmitted from the wireless user communication and processing device 200 to the information content provider server configuration 300.

As indicated in FIG. 4B, exemplary levels of interest such as very low interest, low interest, medium interest, high interest and very high interest are indicated in database 401 for each of the objects 1 to N in the knowledge database 400 of FIG. 4A. In the example provided in FIG. 4B, this particular user has very low interest and Object 3, low interest in Object N, medium interest in Object 1, high interest in Object 4 and very high interest in Object 2. As explained further below, information in databases 400 and 401 is used by the artificial intelligence expert system of this invention to assist users in making decisions regarding response to multicast information dissemination messages.

Expert system technology may be used to assist in determination of an appropriate advisory action index signals used to advise a user of the expert system evaluation of the level of interest the user may have to a particular opportunity based on that users indicated interest in that opportunity and other variables that may factor in to the user's decision of whether or not to pursue that opportunity. For example, and without limitation, the expert system may combine variables representing the users level of interest is indicated in FIG. 4B and the distance of that user from the content provider offering the particular opportunity.

Figure 5:
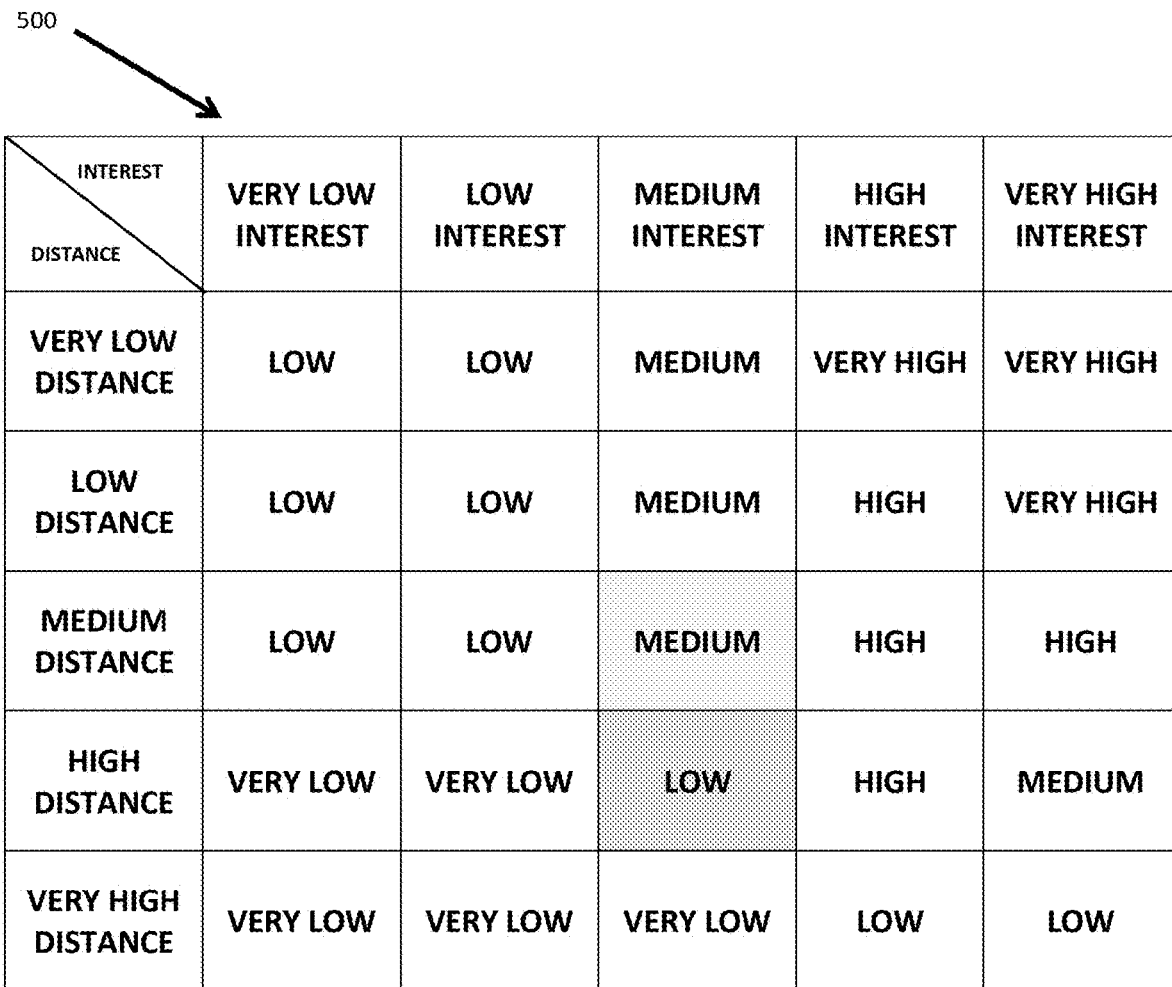
FIG. 5 illustrates, without limitation, exemplary knowledge base expert system advisory action indices for the Multicast Expert System Information Dissemination System and Methods of this invention.

FIG. 5 represents, without limitation, such an expert system combination of the distance and level of interest variables to derive an expert system advisory action index for the user. In this particular example, two variables—user level of interest and user distance—are used to assist in the determination of advisory action variable. As indicated in FIG. 4B, the level of interest variable is defined in terms of five different ranges of interest comprising very low, low, medium, high, and very high. In a similar manner the distance variable is defined in terms of five different ranges comprising very low, low, medium, high, and very high.

For example, the user interest variable may be associated with pre-established user information specifying the users interest in particular opportunities as follows:

interest very low—the user has indicated little or no interest in particular opportunities, interest low—the user has indicated possible potential interest in particular opportunities, interest medium—the user has indicated that they may indeed be interested in particular opportunities, interest high—the user has indicated more than an average interest in particular opportunities, interest very high—the user has indicated a particularly strong interest in particular opportunities.

In a similar manner, for example, numerical ranges for the distance variable may be set by users of the system or, in the alternative, be set to default values by operators of the system as follows:

distance very low—the user of the system is very close to the establishment selling the products, distance low—the user of the system is close to the establishment selling the products, distance medium—the user of the system is in the vicinity of the establishment selling the products but not particularly close by, distance high—the user of the system is further away from the establishment selling the products requiring more of an effort to travel to that establishment, distance very high—the user of the system is a very long way displaced from the location of the establishment selling the products requiring a very determined effort to travel to that establishment.

The knowledge base expert system relationships for the logic variables 500 are used to derive an advisory action index as shown in FIG. 5. As indicated, the advisory action index is defined in terms of ranges comprising very high, high, medium, low, and very low. In the example shown in FIG. 5, a medium interest index and medium distance index results in a medium advisory action index. As also indicated, a medium interest index and high distance index results in a low advisory action index. In other words, the advisory action index decreases with increasing distance indices. As can also be seen from FIG. 5, the advisory action index increases with increased interest indices for given distance parameters.

While the example of FIG. 5 is limited to two variables, interest and distance indices, clearly additional tables may be constructed to include other important variables in the decision process. Multidimensional tables may be constructed with more than two variables to reflect additional indices such as cost, time available or possible additional merchant incentives offered for particular items of sale. Such additional incentives may include for example two-for-one sales or special prize offerings.

The advisory action index matrix 500 of FIG. 5 is a form of artificial intelligence and forms the basis of an intelligent system. For example, each of the results indicated in FIG. 5 may be expressed in propositional calculus logic form, for example, as follows:

1. If interest is medium and the distance is medium then advisory action index is medium.

2. If interest is medium and distance is high then the advisory action index is low.
3. If interest index is very low and distance index is medium then the advisory action index is low.

Clearly 25 such logical statements exist for the entries in FIG. 5. For each such logical statement, an advisory action index for the user may be determined by the expert system of the present invention. Then advisory action index may be displayed on the display 220 of FIG. 2 in various forms including text messages, flashing alerts of various colors for various advisory action indices, with audible messages from the speaker 218 of FIG. 2 or with a combination of such visual or audible alerts.

An important aspect of the present invention is that artificial intelligence is employed to generate a simple advisory action index for presentation to the user without the user having to evaluate incoming opportunity messages or the attractiveness of such opportunities to the user based on the user's current situation. The artificial intelligence presentation greatly simplifies the user interface to the multicast expert system information dissemination system and methods invention. Importantly, the simplified presentation of the advisory action index minimizes cognitive distractions to the user which may contribute to dangerous situations that may arise, for example, for a user driving a vehicle as discussed above.

The intelligent system matrix of FIG. 5 and its associated propositional logic expressions can also be used to formulate a fuzzy logic implementation of the wireless user communication and processing device 200 of FIG. 2 of the present invention. Fuzzy logic has found expanded uses in the development of sophisticated control systems. With this technology complex requirements may be implemented in amazingly simple, easily managed and inexpensive controllers. It is a relatively simple method of representing analog processes on a digital computer. It has been successfully applied in a myriad of applications such as flight control systems, camera systems, antilock brakes systems, wash machines, elevator controllers, hot-water heaters, and stock trading programs.

In the present invention, the above described propositional calculus analysis may be extended to a fuzzy logic reasoning implementation wherein the user specifies his or her level of interest in particular object offerings by rating that interest numerically on a scale of 1 to 10. The variable ranges for interest and distance indicated in FIG. 5 may be "fuzzified" as fuzzy logic variables extending over the defined overlapping ranges as shown, for example, in FIG. 6. Fuzzy logic is a method of representing analog processes on a digital computer. With fuzzy logic control, statements are written in the form of the propositional logic statements as illustrated above. These statements represent somewhat imprecise ideas reflecting the states of the variables.

Fuzzy logic systems make use of "fuzzifers" that convert input variables into their fuzzy representations. "Defuzzifiers" convert the output of the fuzzy logic process into "crisp" numerical values that may be used in system control.

Figure 6:
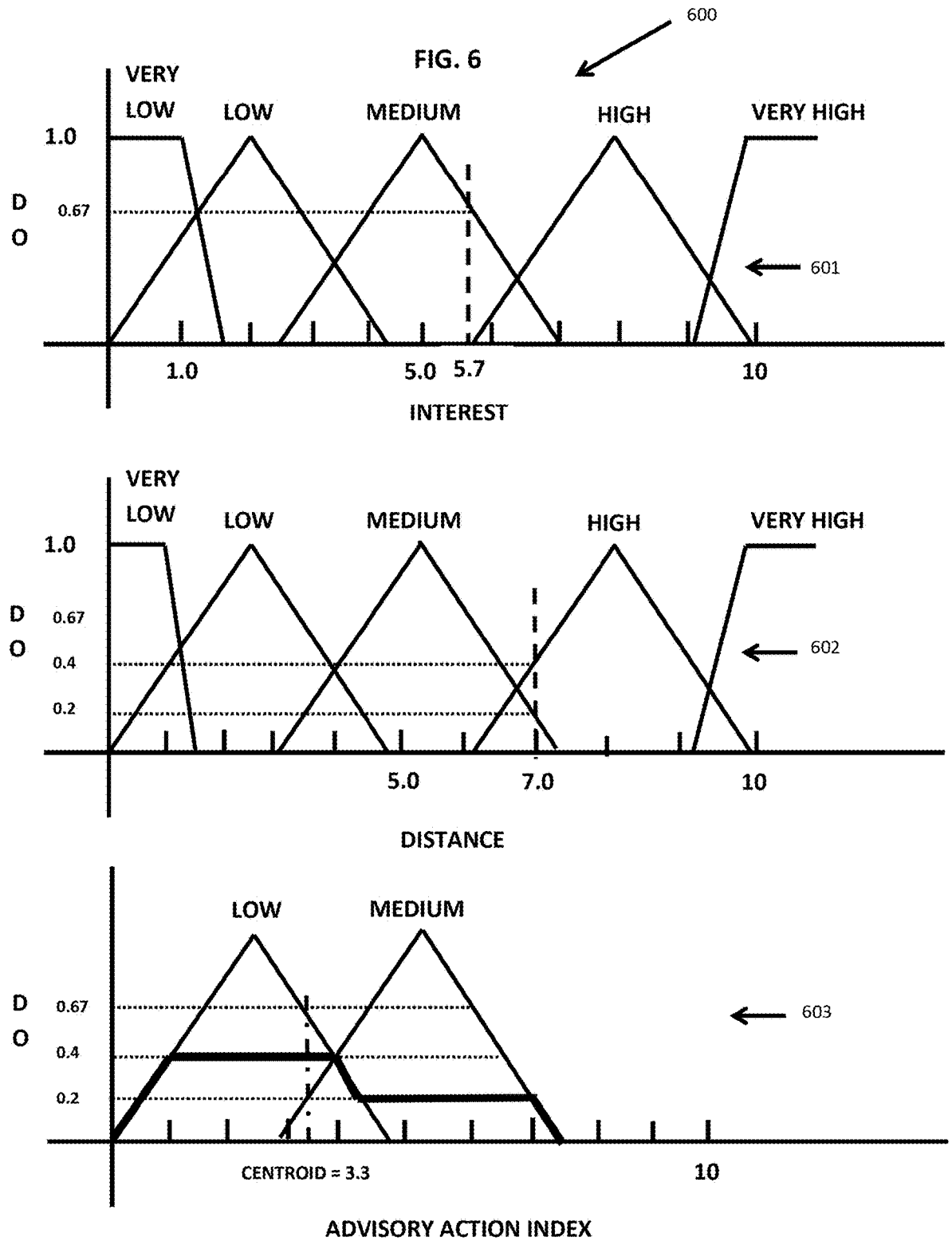
FIG. 6 illustrates, without limitation, exemplary knowledge base fuzzy logic expert system relationships for the logic variables for the Multicast Expert System Information Dissemination System and Methods of this invention.

For example, the graph 601 of FIG. 6 illustrates such a possible "fuzzification" for the level of interest index variable with overlapping ranges indicated in the figure. In this example, on a scale of 1 to 10, the user has indicated a level of interest of 5.7 in a particular object opportunity presented by the content provider. As illustrated in the FIG. 6, a user interest of 5.7 results in a degree of membership (DOM) of 0.67 in the interest membership class "medium." In this particular example, the interest of 5.7 does not result in membership in any other of the possible membership classes.

In a similar way, in the graph 602 of FIG. 6 "fuzzification" of the distance variable is illustrated. On a scale of 1 to 10, a distance of 7 results in a DOM of 0.4 in the distance membership class and 0.2 in the medium distance membership class. The numerical distance of 7 may be the result of a calculation based on GPS coordinates of the user and the content provider 101 of FIG. 1. For example, the distance may be 7 miles. In yet another embodiment, the distance may represent the time necessary to travel from the current location of the user to the content provider 101 of FIG. 1. Such travel times may be given by GPS location services and take into account road conditions, traffic or other factors that may influence the travel time.

These DOM values may in turn be used in the fuzzy logic implementation to derive a defined, "crisp" numerical value for the advisory action index. For example, in the above example of FIGS. 5 and 6, the two propositional logic statements "fire" as follows:

1. If interest is medium and the distance is medium then advisory action index is medium.
2. If interest is medium and distance is high then the advisory action index is low.

The conjunctive relation "and" corresponds to the logical intersection of the two sets corresponding to the interest and distance variables. In this case the appropriate DOM is the minimum DOM for each of the sets at the specified time. This is expressed algebraically as follows:

$$(A \cap B)(x) = \min(A(x), B(x)) \text{ for all } x \in X$$

Premises connected by an "OR" relationship are combined my taking the larger DOM for the intersection values. This is expressed algebraically as follows:

$$(A \cup B)(x) = \max(A(x), B(x)) \text{ for all } x \in X$$

In the case of the two exemplary propositional logic equations above: "If distance is medium and distance is high then advisory action index is low." The conjunctive relation "and" requires the use of the minimum value of the respective DOM's for interest and distance. From the graphs 601 and 602, for these propositional logic equations the corresponding DOM's are 0.67 for the interest variable and 0.4 for the interest variable. Correspondingly, consider the propositional logic equation 1 above: "If interest is medium and distance is medium, then advisory action index is medium." In this case the corresponding DOM's are 0.67 for the user interest variable, and 0.2 for the distance variable.

These values may be used to defuzzify low and medium ranges of the advisory action index degree of memberships. As shown in 603 of FIG. 6, fuzzy ranges for the advisory action index may be defined in a similar manner to the interest and distance variables. A numerical "crisp" value for the advisory action index can now be derived using defuzzification procedures. As shown in FIG. 6, the DOM ranges for the advisory action index are capped at values corresponding to the above analysis for the DOMs of the interest and distance variables. The final "crisp" numerical value of the advisory action index may, for example, be calculated based on the centroid of the geometric figure for the low and medium DOM ranges of the graph 603 of FIG. 6. This calculation may be carried out by dividing the geometric figure of FIG. 6 into sub-areas $A_i$ for each of the individual centroids $x_i$ from the following formula.

$$x_c = \left(\sum_{i=1}^{n} x_i A_i\right) / \left(\sum_{i=1}^{n} A_i\right)$$

The result of such a calculation is shown in FIG. 6 yielding an advisory action index numerical value of 3.3.

While, for simplicity, the above example dealt with only two variables, namely user level of interest and distance indices, the method described above may be expanded to more than two variables.

Figure 7:
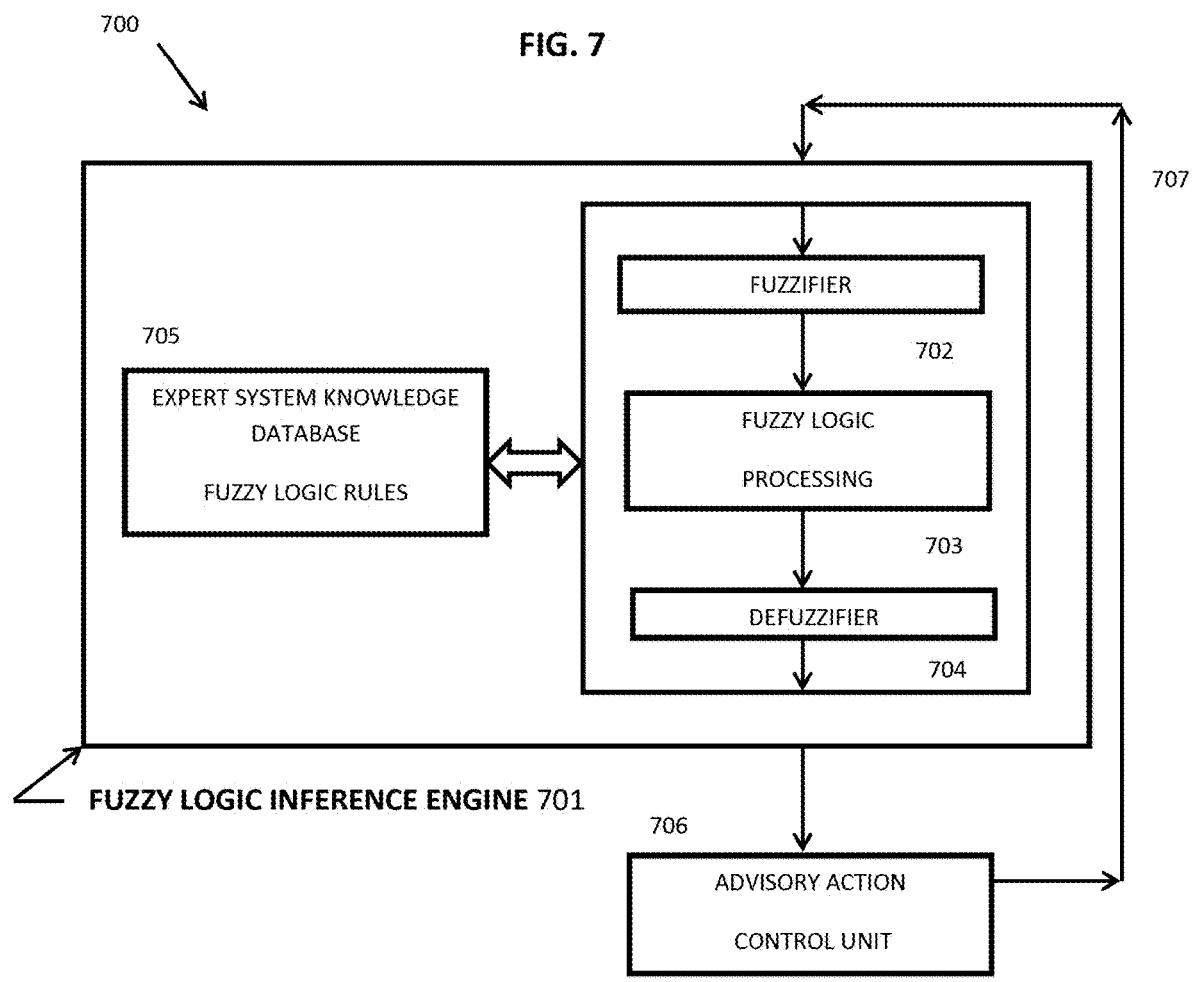
FIG. 7 illustrates, without limitation, an exemplary inference engine expert system fuzzy logic processor for the Multicast Expert System Information Dissemination System and Methods of this invention.

FIG. 7 illustrates in more detail exemplary fuzzy logic inference engine 700 operation and execution by the wireless user communication and processing device 200 of FIG. 2. As shown in the figure, these operations include access to the expert system knowledge base 705 which may include the fuzzy logic rules as discussed above in the form of the user of level of interest database and the advisory action index database of FIGS. 4B and 5. The fuzzy logic operations include the fuzzifier 702 used to establish degree of memberships (DOMs) as discussed above and illustrated in FIG. 6. The outputs of fuzzifier 702 are fed to the fuzzy logic processing element 703. Defuzzifier 704 provides crisp numerical outputs of the advisory action index to the advisory action control unit 706 as illustrated in FIG. 7. Having determined the advisory action index for a particular opportunity situation to be evaluated, control is returned to the beginning of the inference engine operations via path 707 as shown in FIG. 7.

Figure 8:
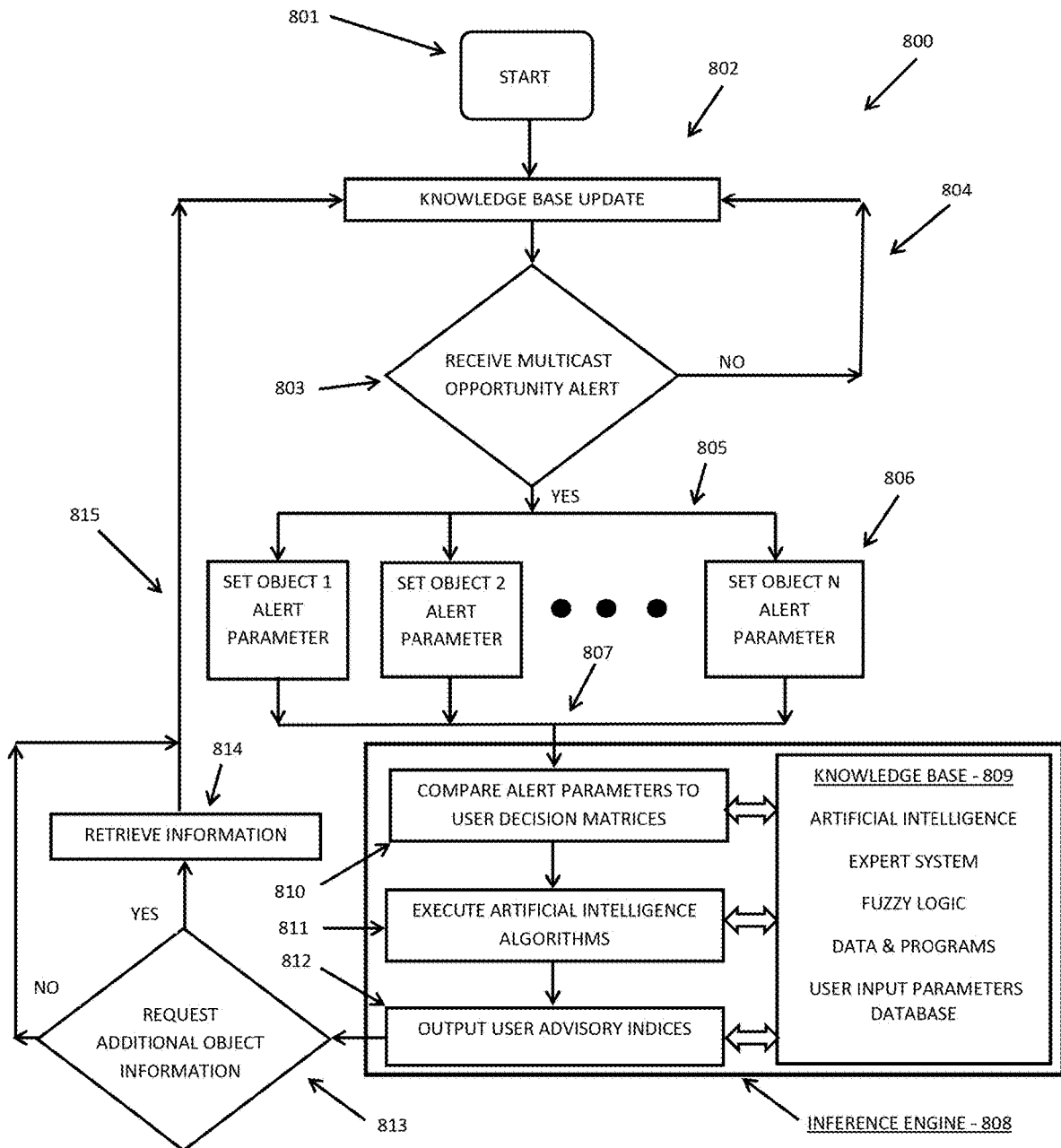
FIG. 8 illustrates, without limitation, an exemplary operational flowchart for the wireless user communication and processing device of the Multicast Expert System Information Dissemination System and Methods of this invention.

FIG. 8 illustrates a flowchart 800 for the artificial intelligence expert system operations of the wireless user communication and processing device 200 of this invention. Operations are initiated at the start block 801. Control is passed to knowledge base update block 802. As explained above, the knowledge base includes artificial intelligence expert system data representing system or situational information and rules for evaluating that information by the inference engine 808 shown in FIG. 8 and discussed more completely below. The knowledge base includes, for example, user object interest indices 401 of FIG. 4B illustrating the level of interest of an individual user in each of the objects 1 to N. Also included in the knowledge base is the advisory action index information 500 of FIG. 5. As also discussed above, these indices may represent rules formulated as precedent if-then propositional statements. The knowledge base also includes information formulating artificial intelligence calculations for evaluating the knowledge base information based on received opportunity messages from the content provider 101 of FIG. 1. In one aspect of this invention, those calculations are based on a fuzzy logic formulation wherein the fuzzy logic is designed to emulate human reasoning when evaluating a particular situation in arriving at courses of action as also described above. In one embodiment of the present invention, the fuzzy logic formulation expressed in the knowledge base is as depicted by calculations 600 illustrated in FIG. 6 and also discussed above.

As indicated at knowledge base update 802 of FIG. 8, the knowledge base itself may be updated by the user or system controllers depending on changing opportunities 400 of the type indicated in FIG. 4A and presented by the content providers 101 of FIG. 1 and upon the individual user interests 401 in those modified opportunities as indicated in FIG. 4B. Parameters used by the artificial intelligence expert system inference engine may also be modified from time to time to more correctly reflect the most likely response of individual users to the opportunities presented and user situation including, for example, the user's physical distance or time travel to the content provider 101 offering the opportunity.

Control is passed from knowledge base update 802 of FIG. 8 to decision element 803 to test for arrival the a multicast opportunity alert from the content provider 101 of FIG. 1. Such alert may, for example, represent an opportunity of possible interest to the wireless communication and processing device 200 user as indicated in FIG. 4A. For example, in the object oriented presentation of FIG. 4A, the message may indicate an opportunity for Object 2, insurance sales position. The multicast opportunity alert may also include the location, such as the GPS coordinates, of the content provider 101 of FIG. 1. If no such alert is detected at decision element 803, control is returned via path 804 to the knowledge base update 802 for further monitoring for modifications to the artificial intelligence expert system knowledge base.

If a multicast opportunity alert is received at decision element 803, control is passed via path 805 to set the object alert parameters corresponding to the received alert. For example, if the alert is for the insurance sales position Object 2 of FIG. 4A and the numerical level of interest is 5.7, the corresponding interest categorization is medium. Correspondingly, if the distance from the user to the content provider 101 of FIG. 1 is 7 miles or units of time, then the distance index corresponds to overlapping medium and high ranges as shown in 602 of FIG. 6. In this case, two expert system propositional statements are fired: (1) If the interest is medium and the distance is medium then the advisor action index is medium; and (2) if the interest is medium and the distance is high then the advisory action index is low.

Having said artificial intelligence expert system object alert parameters, control is passed via path 807 to the artificial intelligence expert system inference engine 808 as shown in FIG. 8. The knowledge base 809 includes the artificial intelligence expert system data, user parameters, programs and algorithms necessary for analysis of the input data by the inference engine 808. At block 810 the alert parameters received by the inference engine 808 are compared to entries in the knowledge base 809. Having determined the proper artificial intelligence expert system values corresponding to the received multicast opportunity alert and the preset parameters in the knowledge base 809, the inference engine 808 executes the appropriate artificial intelligent algorithms such as the fuzzy logic algorithms described above and shown for example in FIG. 6. As indicated in 603 of FIG. 6 the output is a numerical advisory action index which is provided to the user through visual and/or audio indicators by the wireless user communication and processing device 200 of FIG. 2.

Control is then passed to decision element 813 of FIG. 8 where the user may make a decision whether or not to request additional information concerning the opportunity indicated in the received multicast opportunity alert. The user may decide to just ignore the alert and do nothing. Also the user may decide to travel to the content provider 101 to further investigate the opportunity in person. In both of these cases, the user is not required to contact the content provider 101 of FIG. 1, thus preserving user confidentiality with respect to the location and/or buying, purchasing or otherwise showing interest in particular opportunities. If no additional object information is requested control is returned via path 810 to the knowledge base update 802 described above.

As a third option the user may decide that he or she would like to have more information about the opportunity before deciding whether to pursue the opportunity or ignore it. That additional information may be as indicated in the database matrix 400 of FIG. 4A and include, for example, a monetary value of the opportunity, one or more photographs or videos describing the opportunity or other features setting forth additional information of interest to potential respondents. If additional information is requested by the user, that information is then retrieved at 814 by the user from the content provider 101. In this case, it is not necessary for the user to disclose his or her location, but the user's interest in particular opportunities will be made known to the content provider 101. In the event multiple opportunities exist at the same time, the processing operations may prioritize the opportunities according to the respective values of the Advisory Action Indices for the multiple opportunities.

While in the preferred embodiment of the present invention described above and in the accompanying figures, the user of the wireless user communication and processing device 200 is not required to disclose his or her location to the content provider 101, it should be understood that if the user elects to disclose such location information, he or she may do so and such disclosure would be within the scope of this invention. This additional information may be used by the content provider 101 to further refine the selection of object descriptions to correspond more closely to the current location of the user. Such operation with user location information may proceed as described above in the present invention.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method of artificial intelligence expert system analysis and evaluation of remote opportunities or situations of interest to a mobile user and available from a remote content provider comprising:
   a. a specifically programmed wireless device communication computer system comprising electronic memory and telecommunication interfaces;
   b. storing in said electronic memory executable artificial intelligence expert system program code;
   c. storing in said electronic memory parameters descriptive of said remote opportunities or situations of interest to said mobile user;
   d. receiving via said telecommunication interfaces and storing in said electronic memory parameters for derivation of the location said mobile user;
   e. registering with said remote content provider parameters descriptive of said remote opportunities or situations of interest to said mobile user;
   f. receiving from said remote content provider and storing in said electronic memory parameters descriptive of a remote opportunity or situation of interest to said mobile user including availability and location of said remote opportunity or situation, said parameters originating from one or more sources proximate said remote opportunity or situation of interest to said mobile user;
   g. said specifically programmed wireless device communication computer system performing at least the following operations:
      i. accessing from said electronic memory said parameters descriptive of a remote opportunity or situation of interest to said mobile user received from said remote content provider and further comprising information descriptive the availability and location of said remote opportunity or situation of interest to said mobile user;
      ii. accessing from said electronic memory said parameters for derivation of the location said mobile user;
      iii. deriving a parameter defining a distance or travel time between said mobile user and said location of said remote opportunity or situation of interest to said mobile user without disclosing said mobile user location thereby protecting privacy of said mobile user;
      iv. artificial intelligence expert system analysis of expert defined combinations of multidimensional matrix parameters with individual parameter ranges wherein said multidimensional matrix further comprises expert defined propositional logic inference rules defining multiple conditional relationships between said expert defined combinations of multidimensional matrix parameters;
      v. artificial intelligence expert system derivation of advisory action indices based on analysis of said expert defined combinations of multidimensional matrix parameters providing recommended mobile user actions regarding said remote opportunity or situation;
      vi. prioritization of multiple simultaneously occurring remote opportunities or situations of interest to said mobile user based on respective advisory action indices; and,
      vii. wherein derivation of advisory action indices by said artificial intelligence expert system minimizes cognitive distraction of said mobile user in evaluation of said remote opportunity or situation of interest.

2. The method of claim 1 wherein a first parameter of said multidimensional matrix defines a mobile user's level of interest in a particular defined object or situation of interest to said mobile user, said level of interest being within a set of ranges of expert defined possible ranges of level of interest in said particular defined object or situation of interest.

3. The method of claim 2 wherein a second parameter of said multidimensional matrix defines a calculated distance or travel time from current said mobile user's location to the location of said particular defined object or situation of interest to said mobile user, said calculated distance or travel time being within a set of expert defined possible defined ranges of said calculated distance or travel times.

4. The method of claim 3 wherein said artificial intelligence expert system derivation of advisory action indices is based on analysis of expert defined propositional logic statements relating expert defined combinations of said level of interest parameter and said calculated distance or travel time parameter.

5. The method of claim 3 wherein one or more additional parameters of said multidimensional matrix defines one or more of roadway conditions or traffic conditions between said mobile user current location and the location of said particular defined object or situation of interest to said mobile user.

6. The method of claim 5 wherein said artificial intelligence expert system derivation of advisory action indices is based on analysis of expert defined propositional logic statements relating expert defined combinations of said level of interest parameter, said calculated distance or travel time parameter, and said one or more of roadway conditions or traffic conditions parameters.

7. The method of claim 1 wherein multiple mobile users are organized in subgroups with common interests by said remote content provider to receive multicast advisory messages from said remote content provider intended for individual subgroups without any of said multiple mobile users disclosing their location to said remote content provider.

8. The method of claim 7 wherein multicast technology allows for the multicast advisory messages to be delivered to multiple mobile users in select individual cell sites or clusters of cell sites in defined proximity to said remote content provider thereby limiting the geographic area to mobile users that are located within said defined proximity to the remote content provider.

9. The method of claim 8 wherein the mobile user may be one of multiple mobile users assigned the same multicast addresses.

10. The method of claim 7 wherein said mobile user receives multicast advisory messages addressed to a private address of said mobile user.

11. The method of 7 wherein said multicast advisory messages are simultaneously disseminated throughout the network to a selected group of mobile users without being made available to other mobile users including those that maybe located within radio frequency range of said selected group of mobile users.

12. The method of 7 wherein information for said multicast advisory messages is organized in a remote content provider database of layered information with more detailed information available in the lower layers of the database.

13. The method of 12 wherein information for a first multicast advisory message is filtered to limit transmitted information to that from the highest-level layers of said remote content provider database and is sufficient to determine a particular mobile user's interest in an opportunity or situation of interest to said mobile user and available from said remote content provider.

14. The method of 13 wherein said first multicast advisory message filtering assists the mobile user in evaluation of that opportunity or situation without requiring unnecessary user attention to received information from said remote content provider that may be of lesser interest.

15. The method of 14 wherein after receiving filtered said first multicast advisory message, said mobile user contacts said remote content provider only if further information descriptive of the opportunity or situation of interest is desired.

16. The method of 15 wherein said multicast advisory message dissemination comprises voice communications to said mobile users describing opportunities or situations presented by said remote content provider, answering questions from said mobile user, or providing other further information to said mobile users.

17. The method of claim 12 wherein said remote content provider database is accessible from a content provider processor, said remote content provider database comprising information descriptive of said opportunities or situations of interest to said mobile user and further comprising one or more of control information, status information, history information, audio information, video information, image information, operational information, contact information, internet address information, telephone number information, received message information, alarm information or other information useful to said remote content provider.

18. The method of claim 17 wherein said remote content provider database is partially or completely located remote from said remote content provider in a distributed database including distributed cloud-based databases or other remote information storage systems.

19. The method of claim 1 wherein said remote content provider uses a time/clock unit for providing accurate time information disseminated to remote mobile users to ensure coordinated and accurate time available throughout the multicast expert system information dissemination, thereby providing coordination of time sensitive multicast advisory messages describing opportunities or situations of interest to a mobile user and available from a remote content provider.

20. The method of claim 1 wherein database information of said remote content provider may be periodically updated by said remote content provider.

\* \* \* \* \*